US011104232B2

(12) United States Patent
Mittnacht et al.

(10) Patent No.: US 11,104,232 B2
(45) Date of Patent: Aug. 31, 2021

(54) SAFE ENERGY SUPPLY DEVICE FOR A VEHICLE

(71) Applicant: Dr. ing. h.c. F. Porsche Aktiengesellschaft, Stuttgart (DE)

(72) Inventors: Jürgen Mittnacht, Grafenau (DE); Marcus Zacher, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 216 days.

(21) Appl. No.: 16/018,502

(22) Filed: Jun. 26, 2018

(65) Prior Publication Data

US 2019/0001820 A1 Jan. 3, 2019

(30) Foreign Application Priority Data

Jun. 28, 2017 (DE) .......................... 102017114339.4

(51) Int. Cl.
*B60L 3/00* (2019.01)
*B60L 58/20* (2019.01)
(Continued)

(52) U.S. Cl.
CPC ............ *B60L 3/0046* (2013.01); *B60K 6/442* (2013.01); *B60L 3/0092* (2013.01); *B60L 58/20* (2019.02);
(Continued)

(58) Field of Classification Search
CPC ..................................................... B60L 3/0046
See application file for complete search history.

(56) References Cited

U.S. PATENT DOCUMENTS 5,796,175 A * 8/1998 Itoh ....................... B60L 3/0023
307/10.1
9,263,887 B2 2/2016 Tiefenbach
(Continued)

FOREIGN PATENT DOCUMENTS

DE 102009000051 A1 7/2010
DE 102012009219 A1 8/2013
(Continued)

OTHER PUBLICATIONS

German Search Report far German Application No. 10 2017 114 339.4, dated Mar. 22, 2018, with partial English translation—10 pages.
(Continued)

*Primary Examiner* — Daniel Cavallari
(74) *Attorney, Agent, or Firm* — RatnerPrestia

(57) ABSTRACT

An energy supply device for a vehicle having an electric drive, comprising a high-voltage battery having two high-voltage connection contacts and at least one battery string, which is arranged between the high-voltage connection contacts, and at least two string contacts between which the at least one battery string is arranged, and a DC/DC converter, the output side of which provides a low voltage for a low-voltage system of the vehicle and the input side of which is electrically conductively connected to the at least one battery string by way of the two string contacts, wherein the energy supply device is embodied to supply electrical energy to the low-voltage system of the vehicle by way of the at least one battery string in the event of a fault. The invention relates furthermore to a vehicle having an above energy supply device and to a corresponding method for supplying energy for a vehicle having an electric drive.

5 Claims, 2 Drawing Sheets

(51) Int. Cl.
*H02J 7/00* (2006.01)
*B60K 6/442* (2007.10)

(52) U.S. Cl.
CPC ....... *H02J 7/0068* (2013.01); *B60L 2240/547* (2013.01)

(56) References Cited

U.S. PATENT DOCUMENTS

| | | | |
|---|---|---|---|
| 9,365,114 | B2 | 6/2016 | Kim et al. |
| 10,131,233 | B2 | 11/2018 | Choi et al. |
| 2011/0141644 | A1* | 6/2011 | Hastings .............. H02H 1/0015 361/93.2 |
| 2011/0320080 | A1 | 12/2011 | Lehner et al. |
| 2014/0117763 | A1 | 5/2014 | Tiefenbach |
| 2015/0377979 | A1* | 12/2015 | Barth ................. G01R 31/3835 324/433 |
| 2018/0050686 | A1* | 2/2018 | Atluri ..................... F02N 11/04 |
| 2018/0145377 | A1* | 5/2018 | Zheng ....................... H02J 7/34 |
| 2019/0013681 | A1* | 1/2019 | De Breucker ........ H02J 7/0024 |
| 2019/0359081 | A1* | 11/2019 | Erhart ................... H02J 7/0014 |

FOREIGN PATENT DOCUMENTS

| | | |
|---|---|---|
| DE | 102012221570 A1 | 5/2014 |
| JP | 0799701 A | 4/1995 |
| JP | 0946801 A | 2/1997 |
| JP | 2010172137 A | 8/2010 |
| JP | 2014519803 A | 8/2014 |
| JP | 2015116049 A | 6/2015 |
| JP | 2016090366 A | 5/2016 |
| KR | 20120062956 A | 6/2012 |
| KR | 20140033130 A | 3/2014 |
| KR | 20170034021 A | 3/2017 |
| WO | 2015087141 A1 | 6/2015 |

OTHER PUBLICATIONS

Japanese Decision of Refusal for Japanese Application No. 2018-112415, dated Jan. 7, 2020, 5 pages.
Korean Office Action for Korean Application No. 10-2018-0072593, dated Nov. 21, 2019, 5 pages.
Japanese Notification of Reason for Rejection for Japanese Application No. 2018-112415, dated May 28, 2019, 4 pages.
Korean Notice of Preliminary Rejection for Korean Application No. 10-2018-0072593, dated Aug. 11, 2020, 5 pages.

* cited by examiner

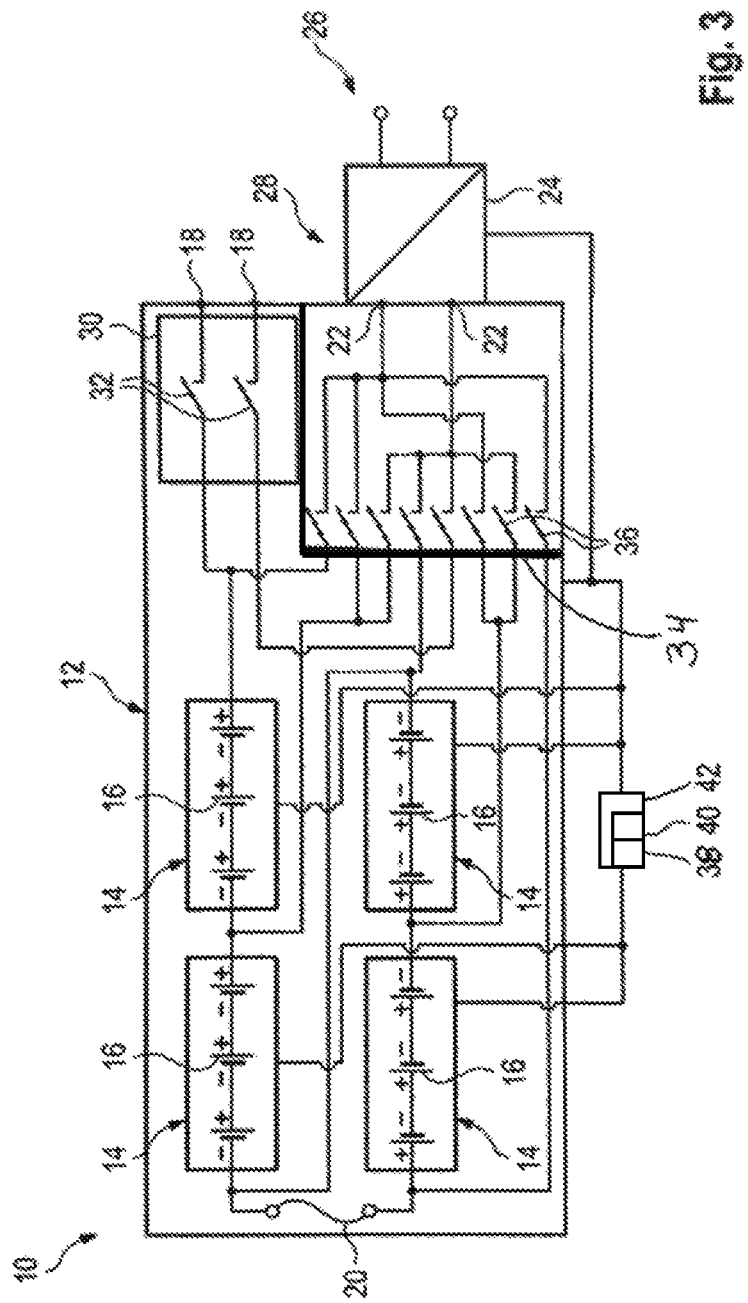

SAFE ENERGY SUPPLY DEVICE FOR A VEHICLE

CROSS-REFERENCE TO RELATED APPLICATION

This application claims priority to German Patent Application No. DE 10 2017 114 339.4, filed Jun. 28, 2017, which is incorporated by reference herein in its entirety.

FIELD OF THE INVENTION

The present invention relates to an energy supply device for a vehicle having an electric drive, comprising a high-voltage battery having two high-voltage connection contacts and at least one battery string, which is arranged between the high-voltage connection contacts, and at least two string contacts between which the at least one battery string is arranged, and a DC/DC converter, the output side of which provides a low voltage for a low-voltage system of the vehicle and the input side of which is electrically conductively connected to the at least one battery string by way of the two string contacts.

The invention relates furthermore to a vehicle having an above energy supply device.

The invention likewise relates to a method for supplying energy for a vehicle having an electric drive, comprising the steps of providing a high-voltage battery having two high-voltage connection contacts and at least one battery string, which is arranged between the high-voltage connection contacts, providing at least two string contacts between each of which at least one battery string is arranged, converting a voltage between the two string contacts to a low voltage for a low-voltage system of the vehicle.

BACKGROUND OF THE INVENTION

In modern vehicles, increasingly higher demands are being made of low-voltage systems, that is to say on-board power supply systems at low voltage, in vehicles. The low-voltage systems relate to a low-voltage supply at a low DC supply voltage of conventionally 12 volts, wherein higher supply voltages of 24 volts or 48 volts are also sometimes used.

Particularly as part of the introduction of more assistance systems that make semiautomated driving (SAD) possible right up to vehicles that make highly automated driving (HAD) possible, the demands on the low-voltage systems that supply power to such assistance systems are also becoming increasingly higher. In corresponding SAD and HAD applications, a redundant low-voltage supply is therefore to be provided for reasons of safety in order to make it possible to operate the vehicle reliably and, where necessary, to stop the vehicle safely. Corresponding demands on a highly reliable low-voltage supply after a first fault require the low-voltage supply to be guaranteed for at least two further minutes after the occurrence of a fault. This demand can be effected, for example, by the installation of two independent batteries for the low-voltage supply. However, a corresponding installation space has to be provided in this case. Moreover, weight and costs for a second battery in the vehicle have to be taken into account.

In vehicles having an electric drive, that is to say particularly hybrid and electric vehicles, a high-voltage battery is required in each case in order to provide electrical energy for drive of the vehicle. High-voltage batteries of this kind usually supply voltages of several as hundred volts in order to limit current intensities and to reduce electrical losses.

In this connection, DE 10 2009 000 051 A1, which is incorporated by reference herein, discloses a method for operating an on-board power supply system of a motor vehicle. The on-board power supply system has at least two on-board power supply subsystems of different voltages. Between the on-board power supply subsystems, there is a coupling that allows electrical energy to flow. The one on-board power supply subsystem is connected to a generator and/or at least one electrical load and the other on-board power supply subsystem is connected to at least one electrical load. There is provision, in the event of a fault, for the voltage supplied by the generator to be reduced to a value that is safe for people, wherein energy still flows from the on-board power supply subsystem having the generator to the other on-board power supply subsystem having the load.

Furthermore, DE 10 2012 221 570 A1, which is incorporated by reference herein, discloses the prevention of a failure in an electrical circuit arrangement of an electrically driven vehicle. The circuit arrangement comprises a high-voltage battery for providing a supply voltage for an electric drive machine, a low-voltage on-board power supply system having at least one electrical load, which can be supplied with an operating voltage, and a main voltage source for providing the operating voltage for the low-voltage on-board power supply system. There is at least one first and one second supplementary voltage source in each case for providing the operating voltage for the low-voltage on-board power supply system, and also a switching device, which, after failure of the main voltage source, electrically connects the low-voltage on-board power supply system to the first supplementary voltage source and, after failure of the first supplementary voltage source, to the second supplementary voltage source.

SUMMARY OF THE INVENTION

Proceeding from the prior art mentioned above, the invention is therefore based on the object of specifying an energy supply device for a vehicle having an electric drive, a vehicle having such an energy supply device and a method for supplying energy for a vehicle having an electric drive, which make it possible to supply energy for low-voltage loads in a simple, reliable and failsafe manner.

The object is achieved according to aspects of the invention by the features of the independent claims. Advantageous refinements of the invention are specified in the as dependent claims.

The invention therefore specifies an energy supply device for a vehicle having an electric drive, comprising a high-voltage battery having two high-voltage connection contacts and at least one battery string, which is arranged between the high-voltage connection contacts, and at least two string contacts between which the at least one battery string is arranged, and a DC/DC converter, the output side of which provides a low voltage for a low-voltage system of the vehicle and the input side of which is electrically conductively connected to the at least one battery string by way of the two string contacts, wherein the energy supply device is embodied to supply electrical energy to the low-voltage system of the vehicle by way of the at least one battery string in the event of a fault.

The invention furthermore specifies a vehicle having an above energy supply device.

The invention likewise specifies a method for supplying energy for a vehicle having an electric drive, comprising the steps of providing a high-voltage battery having two high-voltage connection contacts and at least one battery string, which is arranged between the high-voltage connection contacts, providing at least two string contacts between each of which at least one battery string is arranged, converting a voltage between the two string contacts to a low voltage for a low-voltage system of the vehicle, and supplying electrical energy to the low-voltage system of the vehicle by way of the at least one battery string in the event of a fault.

It is therefore the basic concept of the present invention to provide an energy supply device based on a high-voltage battery, said energy supply device making it possible to reliably utilize present energy of the high-voltage battery for a low-voltage supply of the vehicle. A redundant energy supply of the low-voltage system can therefore be made possible, for example, in a simple and efficient manner when the vehicle comprises an additional low-voltage battery. The low-voltage battery may also be part of the energy supply device. In this case, it is not fundamentally important whether the energy supply device takes over the energy supply only in the event of a fault in the low-voltage supply or at least partly jointly supplies energy to the low-voltage system virtually continuously. It is therefore possible to dispense with a second redundant low-voltage battery by using the high-voltage battery for low-voltage supply. A low-voltage battery is necessary for securing the low-voltage supply, as is usual, in particular from the point of view of failsafety and redundant low-voltage supply.

Each battery string comprises an electrical string having individual battery cells electrically connected in succession. Such a string may sometimes be referred to as a cell stack. In this case, individual battery cells are usually of identical design. A plurality of battery strings are also usually embodied with a respectively equal number of battery cells, as a result of which the handling, wiring and actuation of the battery strings is possible in a very simple manner. Identical battery strings can therefore also be kept available in order to make it possible to replace them easily in the event of damage, for example. An individual string may be fixedly wired. Alternatively, other connections of the battery cells of the respective battery string are also possible. In principle, it is also possible for a battery string to be provided in a modular manner, as a result of which, for example, maintenance and replacement of battery cells of the high-voltage battery are simplified.

In principle, the battery cells can in this case be embodied in any desired manner. At present, lithium-based battery cells are widely used in order to achieve a high storage capacity.

The high-voltage connection contacts are embodied as connection contacts for high-voltage supply of the vehicle, wherein various types of terminals are known in principle and may be used here. In this case, the battery strings can be arranged in principle in any desired manner between the high-voltage connection contacts, starting with an embodiment having only one battery string right up to a parallel and series arrangement of a plurality of battery strings in order to provide a desired combination of voltage and current to the high-voltage connection contacts.

The low-voltage system is an on-board power supply system or supply system that usually operates at a supply voltage of less than 100 V, preferably less than 50 V. Nowadays, a supply system at a supply voltage of 12 V is very common, wherein even supply systems at a supply voltage of 24 V or 48 V are sometimes used.

The string contacts make it possible to contact-connect at least one battery string, wherein, in principle, a plurality of battery strings can also be interconnected in series and/or in parallel between the string contacts. Based on the conventional voltages of battery cells and battery strings compared with the low-voltage system, it is not necessary, however, for the battery strings to not be connected in series in order to make low-voltage supply possible.

The DC/DC converter effects an adjustment of the voltage provided by the at least one battery string to the low-voltage system. In a conventional configuration of the high-voltage battery having battery strings having a plurality of battery cells, the voltage across the at least one battery string is usually higher than the low voltage, which is why the DC/DC converter is usually embodied as a step-down converter.

In an advantageous configuration of the invention, the high-voltage battery has a plurality of battery strings and a changeover apparatus, wherein the input side of the DC/DC converter can be connected to at least one from the plurality of battery strings by way of the changeover apparatus. In principle, a connection of the DC/DC converter to the at least one battery string can be established by the changeover apparatus. In the simplest case, the changeover can therefore be a changeover between a state in which the DC/DC converter is connected to the at least one battery string and a state in which this connection is interrupted. Particularly in the event of damage to the high-voltage battery, the use of said high-voltage battery can be stopped by the changeover apparatus.

In an advantageous configuration of the invention, the input side of the DC/DC converter can be connected alternately to at least one battery string from the plurality of battery strings by way of the changeover apparatus. Alternately means that either at least one string or at least one other string can be selected and connected to the DC/DC converter by way of the changeover apparatus. The DC/DC converter can therefore be supplied with a high voltage from a plurality of different battery strings. The alternating connection of different battery strings makes it possible to supply power to the DC/DC converter from different battery strings, such that energy stored in the battery strings can be drawn from a plurality of battery strings according to requirement and availability. Moreover, a redundancy of the supply of the DC/DC converter is formed by the plurality of connectable battery strings. The battery strings can be selected based on partial voltages of the battery strings, an intake current of the DC/DC converter and/or a load time per battery string. This actuation is preferably implemented as an additional task in an available battery management system.

In an advantageous configuration of the invention, the energy supply device has a checking device for checking the function of the battery strings and is embodied to connect the input side of the DC/DC converter alternately to the at least one battery string from the plurality of battery strings by way of the changeover apparatus based on the function of the battery strings. On the one hand, the checking device may be embodied to identify damage, for example in the event of an accident, or to perform an electrical check of the battery strings. Correspondingly, it is possible to detect, for example, an insulation resistance of the individual battery strings. Depending on the checking of the battery strings, a battery string without damage can be connected to the DC/DC converter in order to supply power to the low-voltage system. States of charge of the battery strings can also be detected in order to connect the best suited battery string to the DC/DC converter.

In an advantageous configuration of the invention, the energy supply device is embodied to connect in alternating fashion the input side of the DC/DC converter alternately to the at least one battery string from the plurality of battery strings by way of the changeover apparatus. On the one hand, this can make it possible to supply power to the low-voltage system over a longer time. In faults in the high-voltage battery occurring later, that is to say a subsequent failure of a battery string, an amount of stored residual energy in each battery string can also be maximized.

In an advantageous configuration of the invention, the high-voltage battery is embodied integrally with the changeover apparatus. As a result, a compact unit that can be used accordingly as an assembly is formed. External contacts are usually complex, expensive and susceptible to faults such that, due to the integral configuration, only two string contacts have to be provided on the unit composed of the high-voltage battery and changeover apparatus. In addition, the DC/DC converter may also be attached to the high-voltage battery as a module or may be embodied as an integral constituent part thereof. As a result, further integration of the energy supply device is achieved, which facilitates the use thereof.

In an advantageous configuration of the invention, the energy supply device has a monitoring device, which is embodied to monitor the low-voltage system of the vehicle, and the energy supply device is embodied to supply energy from the at least one battery string by way of the DC/DC converter to the low-voltage system in the event of a fault in the low-voltage system detected by the monitoring device. The monitoring device thus determines a fault in the low-voltage system in order to activate the supply of power by the DC/DC converter from the at least one battery string in the event of a fault. It is thereby possible to prevent losses, such as those occurring in a permanently operated DC/DC converter.

In an advantageous configuration of the invention, the high-voltage battery has a fuse device, which interrupts a connection between the two high-voltage connection contacts in the event of a fault, and the two string contacts are electrically conductively connected directly to the at least one battery string. The fuse device may comprise one or more fuse elements, for example an isolating switch, a safety fuse, or other fuse elements. The high-voltage battery usually comprises an isolating apparatus in order to switch the two high-voltage connection contacts to zero voltage in the event of a fault. This is necessary, for example, in the case of an accident of the vehicle or a fault in the high-voltage system of the vehicle, for example in the case of a short circuit, overloading, a cell fault in a battery string, a failure of a control device or similar. The isolating apparatus may also be connected to the high-voltage connection contacts as a modular isolating apparatus. The isolating apparatus is preferably fixedly attached here to the high-voltage battery. The isolating apparatus can therefore be easily replaced in the event of damage or a faulty function. As an alternative or in addition, the high-voltage battery may have a central fuse, which is arranged, for example, between two battery strings. A flow of current through the high-voltage battery can also be interrupted by the central fuse such that the connection contacts are switched to zero voltage in the event of a fault. The central fuse is tripped, for example, in the case of particularly severe short circuits, for example in the event of an accident. The direct connection of the two string contacts to the at least one battery string in this case means that the connection is made by bypassing the fuse devices and therefore also that a voltage is applied to the input side of the DC/DC converter in the event of a fault in order to supply power to the low-voltage system. Here, in the case of a direct connection of the DC/DC converter to a plurality of battery strings, each of said battery strings can be alternatively connected to the DC/DC converter.

BRIEF DESCRIPTION OF THE DRAWINGS

Below, the invention will be explained by way of example with reference to the appended drawings and on the basis of preferred exemplary embodiments, wherein the features presented below may in each case individually or in combination represent an aspect of the invention.

In the drawings:

FIG. 3: shows a schematic view of an energy supply device for a vehicle having an electric drive comprising a high-voltage battery having four battery strings connected in succession in accordance with a third embodiment.

DETAILED DESCRIPTION OF THE INVENTION

Figure 1:
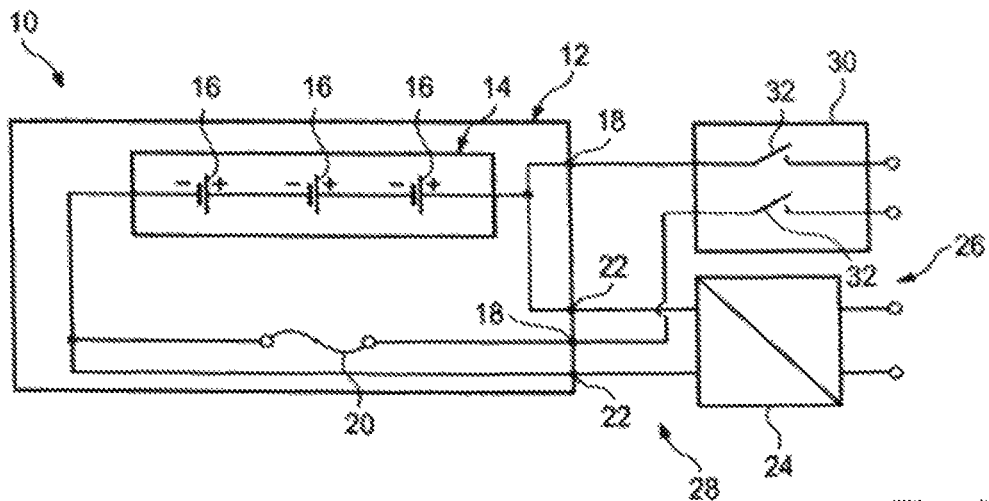
FIG. 1: shows a schematic view of an energy supply device for a vehicle having an electric drive comprising a high-voltage battery having a battery string in accordance with a first, preferred embodiment.

FIG. 1 shows an energy supply device 10 according to aspects of the invention for a vehicle having an electric drive in accordance with a first, preferred embodiment.

In accordance with the first exemplary embodiment, the energy supply device 10 comprises a high-voltage battery 12 having a battery string 14 in which a plurality of battery cells 16 are connected in series. In FIG. 1, only three battery cells 16 are illustrated for reasons of simplified illustration. However, significantly more battery cells 16 in the battery string 14 are usual here in order to be able to provide a corresponding high voltage. In this case, the individual battery cells 16 are each embodied identically as lithium-based battery cells 16. The high-voltage battery 12 also comprises two high-voltage connection contacts 18 between which the battery string 14 is arranged. In this case, the battery string 14 is connected in series with a fuse 20.

The high-voltage battery 12 also comprises two string contacts 22 between which the battery string 14 is connected directly and while bypassing the fuse 20.

The energy supply device 10 of the first exemplary embodiment further comprises a DC/DC converter 24, which provides a low voltage on its output side 26 for a low-voltage system of the vehicle. The low-voltage system is an on-board power supply system or to supply system that operates in this case at a supply voltage of 12 V. The DC/DC converter 24 is electrically conductively connected on its input side 28 to the battery string 14 by way of the two string contacts 22. The DC/DC converter 24 is embodied here as a step-down converter in order to convert a high voltage at the string contacts 22 to a low voltage for supplying power to the low-voltage system.

The energy supply device 10 furthermore comprises an isolating apparatus 30, which is connected to the two high-voltage connection contacts 18. The isolating apparatus 30 comprises one isolating switch 32 for each of the high-voltage connection contacts 18. Using the isolating apparatus 30, the high-voltage battery 12 can be electrically isolated from a connected high-voltage system of the vehicle.

The energy supply device 10 is embodied to supply electrical energy to the low-voltage system of the vehicle by way of the battery string 14 in the event of a fault.

Figure 2:
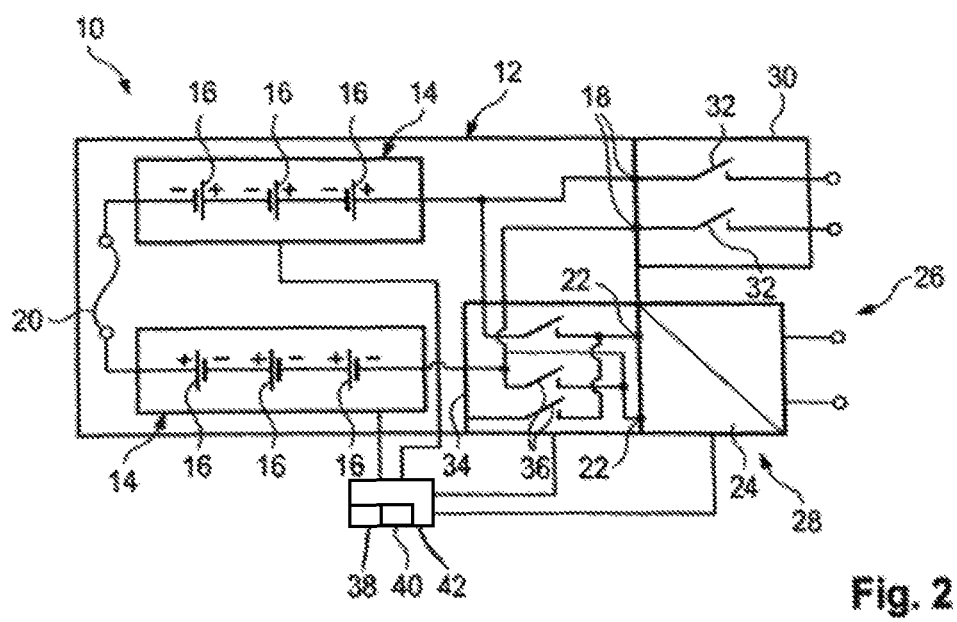
FIG. 2: shows a schematic view of an energy supply device for a vehicle having an electric drive comprising a high-voltage battery having two battery strings connected in succession in accordance with a second embodiment.

FIG. 2 shows an energy supply device 10 according to aspects of the invention for a vehicle having an electric drive in accordance with a second embodiment.

The energy supply device 10 of the second embodiment is based on the energy supply device 10 of the first embodiment, which is why the same reference signs are used for similar components. Furthermore, the remarks with respect to the first embodiment apply accordingly to the energy supply device 10 of the second embodiment, unless explicitly stated otherwise.

In accordance with the second exemplary embodiment, the energy supply device 10 comprises a high-voltage battery 12 having two battery strings 14. A plurality of battery cells 16 are connected in series in each of the battery strings 14, wherein only three battery cells 16 are illustrated in FIG. 2 for reasons of simplified illustration. Significantly more battery cells 16 in each battery string 14 are usual here in order to provide a corresponding high voltage. The individual battery cells 16 are each embodied identically as lithium-based battery cells 16. The battery strings 14 are embodied identically and comprise a respectively equal number of battery cells 16. The battery cells 16 of each of the battery strings 14 are fixedly wired.

The high-voltage battery 12 also comprises two high-voltage connection contacts 18 between which the two battery strings 14 are arranged. The battery strings 14 are connected in series with a fuse 20, which is arranged between the two battery strings 14.

The energy supply device 10 of the second exemplary embodiment also comprises a DC/DC converter 24, which provides a low voltage on its output side 26 for a low-voltage system of the vehicle. The DC/DC converter 24 is electrically conductively connected on its input side 28 to two string contacts 22 of the high-voltage battery 12. The DC/DC as converter 24 is embodied here as a step-down converter in order to convert a high voltage at the string contacts 22 to a low voltage for supplying power to the low-voltage system.

In addition to the first embodiment, the high-voltage battery 12 of the second embodiment has a changeover apparatus 34. The changeover apparatus 34 comprises a plurality of switching elements 36, which can be used to connect in each case one of the two battery strings 14 directly to the string contacts 22 while bypassing the fuse 20. When all the switching elements 36 are open, none of the battery strings 14 is connected to the string contacts 18. The DC/DC converter 24 can accordingly be connected at its input side 28 to each of the battery strings 14 by way of the changeover apparatus 34.

The energy supply device 10 furthermore comprises an isolating apparatus 30, which is connected to the two high-voltage connection contacts 18. The isolating apparatus 30 comprises one isolating switch 32 for each of the high-voltage connection contacts 22. Using the isolating apparatus 30, the high-voltage battery 12 can be electrically isolated from a connected high-voltage system of the vehicle.

The energy supply device 10 furthermore comprises a monitoring device 38, which is embodied to monitor the low-voltage system of the vehicle by way of the DC/DC converter 24. The monitoring device 38 thus determines a fault in the low-voltage system in order to activate the supply of power by the DC/DC converter 24 from one of the battery strings 14 in the event of a fault.

The energy supply device 10 further has a checking device 40, which is embodied to continuously check a function of the battery strings 14. The checking device 40 is embodied to identify damage to each of the battery strings 14, for example in the case of an accident, and to perform an electrical check of the battery strings 14 by virtue of an insulation resistance of the individual battery strings 14 being detected.

Both the monitoring device 38 and the checking device 40 are in this case an integral constituent part of a battery management system 42.

The changeover apparatus 34 is actuated by the battery management system 42 based on the low voltage of the low-voltage system monitored by the monitoring device 38. The DC/DC converter 24 is accordingly connected on its input side 28 alternately to the two battery strings 14. The changeover apparatus 34 is changed over based on the function ds of the battery strings 14 checked by the checking device 40. If the function of the battery strings 14 permits it, the DC/DC converter 24 is connected in alternating fashion to the two battery strings 14. In this case, the battery string 14 is selected in each case based on partial voltages of the battery strings 14, an intake current of the DC/DC converter 24 and/or a load time per battery string 14, which are continuously determined by the battery management system 42.

In this exemplary embodiment, the changeover apparatus 34 is an integral constituent part of the high-voltage battery 12. In an alternative exemplary embodiment, the changeover apparatus 34 is a separate constituent part of the energy supply device 10. In the alternative exemplary embodiment, the high-voltage battery 12 accordingly has a plurality of string contacts 22, wherein each battery string 14 is connected to a pair of string contacts 22. The changeover apparatus 34 can thereby connect each of the battery strings 14 at its input side 28 to the DC/DC converter 24.

In accordance with the second exemplary embodiment, the DC/DC converter 24 is attached directly to the high-voltage battery 12. The same applies to the isolating apparatus 30. Alternatively, both the DC/DC converter 24 and the isolating apparatus 30 can be, independently of one another, an integral constituent part of the high-voltage battery 12.

FIG. 3 shows an energy supply device 10 according to aspects of the invention for a vehicle having an electric drive in accordance with a third embodiment.

The energy supply device 10 of the third embodiment is based on the energy supply device 10 of the second embodiment, which is why the same reference signs are used for similar components. Furthermore, the remarks with respect to the second embodiment apply accordingly to the energy supply device 10 of the third embodiment, unless explicitly stated otherwise.

In accordance with the third exemplary embodiment, the energy supply device 10 comprises a high-voltage battery 12 having four battery strings 14. The battery strings 14 are embodied identically as described above with a respectively equal number of identical battery cells 16.

The high-voltage battery 12 also comprises two high-voltage connection contacts 18 between which the four battery strings 14 are arranged. The battery strings 14 are as connected in series with a fuse 20, which is arranged centrally between the four battery strings 14.

The energy supply device 10 of the third exemplary embodiment also comprises a DC/DC converter 24, which provides a low voltage on its output side 26 for a low-voltage system of the vehicle. The DC/DC converter 24 is electrically conductively connected on its input side 28 to two string contacts 22 of the high-voltage battery 12. The DC/DC converter 24 is embodied here as a step-down converter in order to convert a high voltage at the string contacts 22 to a low voltage for supplying power to the low-voltage system.

The high-voltage battery 12 of the third embodiment likewise comprises a changeover apparatus 34. The changeover apparatus 34 comprises a plurality of switching elements 36, which can be used to connect each of the four battery strings 14 directly to the string contacts 22 and while bypassing the fuse 20. When all the switching elements 36 are open, none of the battery strings 14 is connected to the string contacts 22.

The energy supply device 10 furthermore comprises an isolating apparatus 30, which is connected to the two high-voltage connection contacts 18. The isolating apparatus 30 is in this case a constituent part of the high-voltage battery 12 and comprises one isolating switch 32 for each of the high-voltage connection contacts 18.

The energy supply device 10 furthermore comprises a monitoring device 38, which is embodied to monitor the low-voltage system of the vehicle by way of the DC/DC converter 24. The energy supply device 10 further has a checking device 40, which is embodied to continuously check a function of the battery strings 14. The checking device 40 is embodied to identify damage to each of the battery strings 14. Both the monitoring device 38 and the checking device 40 are in this case an integral constituent part of a battery management system 42. For details, reference is made to the remarks with respect to the second embodiment.

The changeover apparatus 34 is actuated by the battery management system 42 based on the low voltage of the low-voltage system monitored by the monitoring device 38. The DC/DC converter 24 is accordingly connected on its input side 28 alternately to the four battery strings 14. The changeover apparatus 34 is changed over based on the function of the battery strings 14 checked by the checking device 40. If the function of the battery strings 14 permits it, the DC/DC converter 24 is connected in alternating fashion to the battery strings 14. In this case, the battery string 14 is selected in each case based on as partial voltages of the battery strings 14, an intake current of the DC/DC converter 24 and/or a load time per battery string 14, which are continuously determined by the battery management system 42.

What is claimed is:

1. An energy supply device for a vehicle having an electric drive, comprising:
   a high-voltage battery having two high-voltage connection contacts and at least one battery string arranged between the high-voltage connection contacts, and at least two string contacts between which the at least one battery string is arranged,
   a DC/DC converter having an output side and an input side, the output side configured to provide a low voltage for a low-voltage system of the vehicle and the input side electrically conductively connected to the at least one battery string by way of the two string contacts, and
   a battery management system having a monitoring device configured to monitor the low-voltage system of the vehicle,
   wherein the DC/DC converter of the energy supply device supplies electrical energy from the at least one battery string to the low-voltage system of the vehicle by way of the at least one battery string in the event of a fault in the low-voltage system as detected by the monitoring device,
   wherein the high-voltage battery has a plurality of battery strings and a changeover apparatus,
   wherein the input side of the DC/DC converter is connectable alternately to at least one battery string of the plurality of battery strings by way of the changeover apparatus, and
   wherein the changeover apparatus of the energy supply device connects, in alternating fashion, the input side of the DC/DC converter alternately to the at least one battery string from the plurality of battery strings.

2. The energy supply device as claimed in claim 1, wherein the battery management system of the energy supply device has a checking device for checking the function of the battery strings and is configured to connect the input side of the DC/DC converter alternately to the at least one battery string from the plurality of battery strings by way of the changeover apparatus based on a function of the battery strings.

3. The energy supply device as claimed in claim 1, wherein the changeover apparatus is positioned within the high-voltage battery.

4. The energy supply device as claimed in claim 1, wherein the high-voltage battery has a fuse device, the fuse device configured to interrupt a connection between the two high-voltage connection contacts in the event of the fault.

5. A vehicle having an energy supply device as claimed in claim 1.

* * * * *